United States Patent Office 3,425,330
Patented Feb. 4, 1969

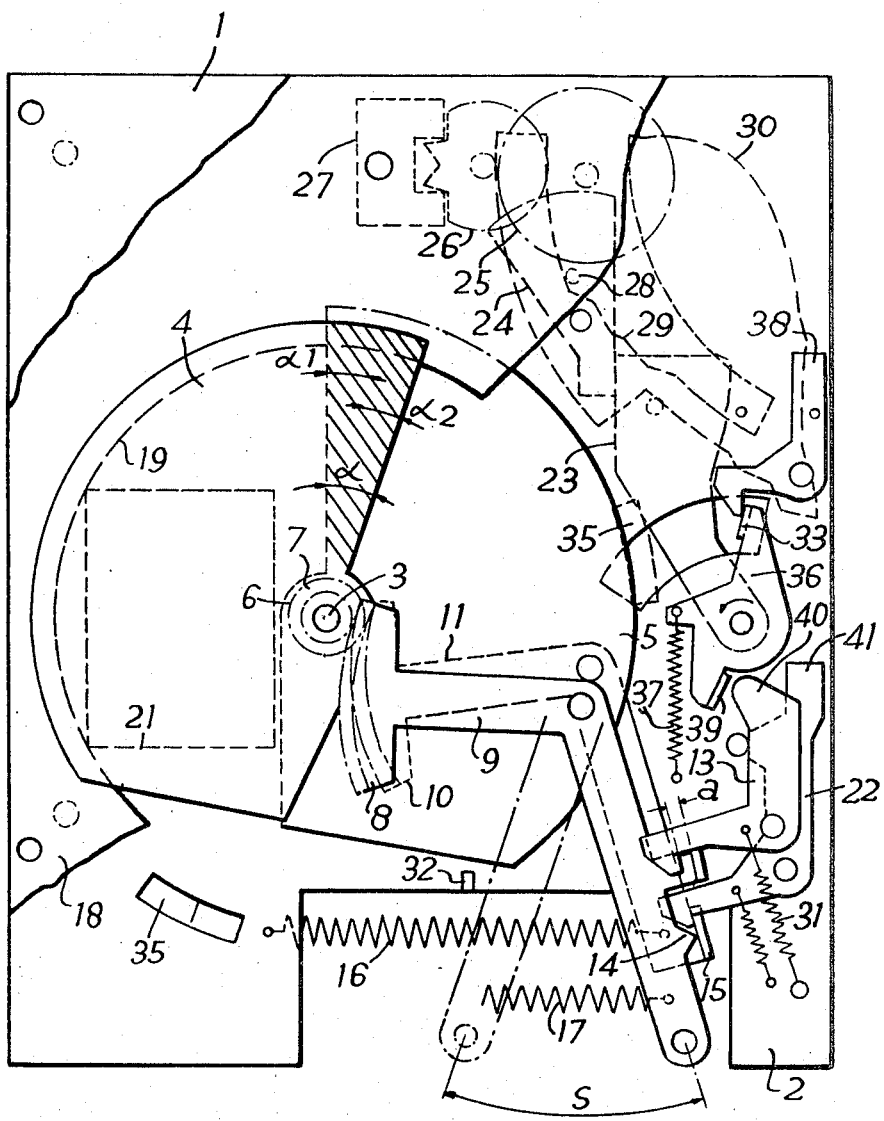
INVENTORS
ROLF NOACK
JOHANNES WEISE
BY WOLFGANG RIEDEL
ATTORNEYS

3,425,330
PHOTOGRAPHIC SHUTTER
Rolf Noack, Johannes Weise, and Wolfgang Riedel, Dresden, Germany, assignors to Veb Pentacon Dresden Kamera- und Kinowerke, Dresden, Germany
Filed Sept. 30, 1965, Ser. No. 491,635
U.S. Cl. 95—60   1 Claim
Int. Cl. G03b 9/26

ABSTRACT OF THE DISCLOSURE

The photographic shutter is provided with a pair of shutter discs, both being rotatable in one direction successively under spring action to open and to close the aperture and in the other direction together in overlapping relation with each other to prevent light passing through the aperture. The discs during their movement together are coupled together by means of a lost motion connection having an angular dimension of overlap which is reduced by lugs angularly displaced from each other, said lugs being released successively by pawls.

Background of invention

The invention relates to photographic cameras and in particular to a photographic shutter having rotating opening and closing discs which in succession open and close the image aperture at an interval of time controllable by an escapement.

Shutters of this kind have the property of constantly increasing the speeds of the opening and closing discs during running off, so that there is danger of uneven picture exposures, especially in the case of short exposure times. In order to compensate for this phenomenon which also occurs in curtain-type shutters, it is known in the latter case to accelerate the opening curtain out of its rest position at a greater rate than the acceleration rate of the closing curtain. Such a method is limited with regard to increasing the acceleration, if only for reasons of strength in the case of shutter discs which consist of metal foils and in any case are already highly accelerated; on the other hand, in the case of such metallic shutter discs it is necessary in the cause of light-tightness to select a greater overlap between the opening and closing discs than between the opening and closing curtains of a curtain-type shutter. This overlap, serving for light-tightness, however, becomes far greater than the amount of overlap which corresponds to the lead of the opening disc for the purpose of achieving a running-off speed greater than that of the closing disc. By reason of these circumstances the measures known in curtain-type shutters are not readily suitable for metal-disc shutters.

The aim of the invention is the provision of a device which ensures both uniform picture exposure and also adequate light-tightness.

Summary of the invention

According to the invention there is provided a photographic shutter having an aperture opening disc and an aperture closing disc, both being mounted for rotation in one direction under spring action to open and to close respectively the camera aperture and in the other direction together in overlapping relationship with each other to prevent light passing through the aperture, the provision of (a) a first releasable pawl for securing against movement the opening disc in a cocked position,
(b) a second releasable pawl for securing against movement the closing disc in a cooked position,
(c) an escapement mechanism for determining the moment of release of the second pawl,
(d) an opening lever and a closing lever,
(e) gearing means effecting a drive connection between the levers and the opening and closing discs respectively, and
(f) first and second lugs provided on said opening and closing levers respectively and engageable by said first and second releasable pawls respectively, wherein the opening disc, during the cocking of the shutter mechanism, overlaps the closing disc by a sector which consists of a first sector over which the opening disc travels prior to release of the shutter and a second sector which is the extent of the overlap in the cocked position of the shutter and, during simultaneous movement of the levers for the purpose of cocking, the first pawl which holds the opening lever first drops behind the first lug and on continued movement of said levers, over a distance corresponding to the size of the first sector, the pawl which holds the closing lever then drops behind the second lug.

Brief description of drawings

A constructional form of the invention will now be described by way of example with reference to the accompanying drawing which is an elevational view of a shutter device made in accordance with the invention.

Between the plates 1 (illustrated only partially) and 2 the opening disc 4 and the closing disc 5 are rotatably mounted for about the spindle 3. With the opening disc 4 there is rigidly connected the pinion 7 and with the closing disc there is rigidly connected the pinion 6. With the pinion 7 there meshes the toothed segment arm 8 of the opening lever 9, and the toothed segment arm 10 of the closing lever 11 is in engagement with the pinion 6. The opening lever 9 has a catch tab 12, which can be grasped by the pawl 13 under the action of a spring 31. Moreover, the opening lever 9 possesses a nose 14, in the path of which there is arranged a coupling lug 15 of the closing lever 11. The coupling lug 15 is grasped by the pawl 22. Moreover, on the opening lever 9 there is secured the opening spring 17 and on the closing lever 11 there is secured the closing spring 16. Between the opening disc 4 and the closing disc 5 there lies the guide plate 18, which has a circular cut-away portion 19. Coinciding image apertures 21 are cut into the plates 1 and 2.

On the plate 2 there is mounted the spring-driven time-control disc 36, which is held against the drive spring 37 by the release lever 38. In the path of the drive tab 33 of the time-control disc 36 there lies the concentrically rotatably mounted escapement lever 23. The escapement lever 23 is in gear connection through the toothed segment 24 with the escapement mechanisms 25, 26, 27. A control pin 28 of the toothed segment 24 can be pivoted by the control cam 29 of a time-setting element 30 into different initial positions, so that different exposure times are produced. In the running-off path of the control dog 39 of the time-control disc 36 there are arranged the operating arms 40 and 41 of the pawls 13 and 22.

The manner of operation of the shutter is as follows:

During the cocking operation the opening lever 9 moves from its rest position shown chain-dotted so that the nose 14 engages the coupling lug 15 and the opening disc 4 covers over the closing disc 5 by the sector $\alpha$. When due to the engagement of the opening lever 9 the cocking distance has been travelled, then the pawls 13 and 22 drop behind the catch tab 12 and the coupling lug 15, the pawl 13 leaving a lead $a$ for the opening lever 9. Even before the release of the shutter the opening lever 9 can travel the lead distance $a$ and in doing so rotate the opening disc 4 according to the size of the covering sector $\alpha_2$, so that there still remains an overlap to the extent of the sector $\alpha_1$. Thus in comparison with the closing disc 5 there is obtained for the opening disc 4 a greater starting travel up to the commencement of the actual exposure, so that the operation of opening the opening disc 4 takes place with greater speed than the closing operation carried out by the closing disc 5.

When the release lever 38 is actuated against its retaining spring, the drive spring 37 can rotate the time-control disc 36, which successively actuates the pawls 13 and 22 by grasping the operating arms 40 and 41. Through the segment arm 8 the opening lever 9 drives the opening disc 4 in the counterclockwise direction, so that the opening disc 4 springs out of the region of the image aperture 21. The return of the opening lever 9 into the rest position is limited by a stop 32. The running off of the closing lever 11 is retarded according to the measure of the pre-set escapement, as a result of the escapement lever 23. Then the closing lever 11 permits the closing disc 5 to follow the opening disc 4, which comes to a halt in the region of the image aperture 21. The opening disc 9 and the closing disc 11 are arrested by brake springs 35.

We claim:

1. In a photographic shutter having an aperture opening disc and an aperture closing disc, both being mounted for rotation in one direction under spring action to open and to close respectively the camera aperture and in the other direction together in overlapping relationship with each other to prevent light passing through the aperture, the provision of
   (a) a first releasable pawl for securing against movement the opening disc in a cocked position,
   (b) a second releasable pawl for securing against movement the closing disc in a cocked position,
   (c) an escapement mechanism for determining the movement of release of the second pawl,
   (d) an opening lever and a closing lever,
   (e) gearing means effecting a drive connection between the levers and the opening and closing disc respectively, and
   (f) first and second lugs provided on said opening and closing levers respectively and engageable by said first and second releasable pawls respectively, wherein the opening disc, during the cocking of the shutter mechanism, overlaps the closing disc by a sector which consists of a first sector over which the opening disc travels prior of release of the shutter and a second sector which is the extent of the overlap in the cocked position of the shutter and, during simultaneous movement of the levers for the purpose of cocking, the first pawl which holds the opening lever first drops behind the first lug and on continued movement of said levers, over a distance corresponding to the size of the first sector the pawl which holds the closing lever then drops behind the second lug.

References Cited

UNITED STATES PATENTS

| 2,179,718 | 11/1939 | Fedotoff | 95—60 |
| 2,429,972 | 11/1947 | Aiken | 95—60 X |
| 2,474,323 | 6/1949 | Rattray | 95—60 X |
| 2,238,491 | 4/1941 | Hutchison | 95—60 |
| 3,334,563 | 8/1967 | Kiper | 95—60 |

JOHN M. HORAN, *Primary Examiner.*